(12) United States Patent
Bowden

(10) Patent No.: US 11,236,894 B2
(45) Date of Patent: Feb. 1, 2022

(54) GRAND CHANDELIER PIGGY BACK LIGHT ADAPTER KIT

(71) Applicant: Michael Shane Bowden, Chickasaw, AL (US)

(72) Inventor: Michael Shane Bowden, Chickasaw, AL (US)

( * ) Notice: Subject to any disclaimer, the term of this patent is extended or adjusted under 35 U.S.C. 154(b) by 0 days.

(21) Appl. No.: 16/501,615

(22) Filed: Jul. 24, 2019

(65) Prior Publication Data

US 2021/0025577 A1  Jan. 28, 2021

(51) Int. Cl.
| | |
|---|---|
| *F21S 8/06* | (2006.01) |
| *F21W 121/00* | (2006.01) |
| *F21V 23/00* | (2015.01) |
| *H02G 3/08* | (2006.01) |
| *H02G 3/14* | (2006.01) |

(52) U.S. Cl.
CPC ............ *F21V 23/001* (2013.01); *F21S 8/065* (2013.01); *H02G 3/081* (2013.01); *H02G 3/14* (2013.01); *F21W 2121/00* (2013.01)

(58) Field of Classification Search
CPC ....... F21S 8/065; F21S 8/06–08; F21V 23/06; F21V 21/008
See application file for complete search history.

(56) References Cited

U.S. PATENT DOCUMENTS

| | | | | |
|---|---|---|---|---|
| 4,403,278 | A * | 9/1983 | Flood | F21S 8/06 362/368 |
| 4,802,865 | A * | 2/1989 | Alibert | H01R 13/59 439/461 |
| 6,494,589 | B1 * | 12/2002 | Shyu | F21S 8/06 362/404 |
| 2003/0063977 | A1 * | 4/2003 | Steeves LeBlanc | F21V 33/0096 416/244 R |
| 2010/0302768 | A1 * | 12/2010 | Collins | F21V 7/09 362/217.05 |
| 2020/0144766 | A1 * | 5/2020 | Kohen | H01R 24/66 |

* cited by examiner

*Primary Examiner* — Rajarshi Chakraborty
*Assistant Examiner* — Steven Y Horikoshi

(57) ABSTRACT

The grand chandelier adaptor provides the means of joining two or more chandeliers or a chandelier with an accessory. This adaptor includes a junction box to facilitate the electrical connection as well as the physical support of each device.

8 Claims, 4 Drawing Sheets

GRAND CHANDELIER PIGGY BACK LIGHT ADAPTER KIT

CROSS-REFERENCE TO RELATED APPLICATION

Not Applicable

FEDERALLY SPONSORED RESEARCH

Not Applicable

SEQUENCE LISTING OF PROGRAM

Not Applicable

1. FIELD OF INVENTION

The present invention related to a chandelier junction box with the capability of hanging chandeliers from one another. Piggybacking lights is the method used. This device greatly simplifies piggybacking two or more chandeliers.

Many improvements have been made to chandeliers through the years, no piggyback adaptors are available.

We believe that the chandelier is such a monumental staple of art & light in the design world, it will be sought after in many ways.

Even though no such device exists to couple two or more chandeliers Together to become one. This device provides that means for the first time.

This design style and materials including, but not limited to cast aluminum and brass.

The "joining of two or more chandeliers or other electrical devices" requires both physical support and electrical connection. The invented device will provide for both physical support and electrical connection. The electrical connection will be made in a junction box with the wires hidden from view.

BRIEF SUMMARY OF THE INVENTION

The invention will allow the piggybacking capability of chandeliers from one another. The capability of hanging chandeliers from one another has not been done before now.

BRIEF DESCRIPTION OF THE DRAWINGS

The drawings of the junction box and physical connections are shown in Simplified cross sectional side views of different designs.

Junction box FIG. 1 CYLINDER SHAPE
FIG. 2 BAGUETTE DIAMOND
FIG. 3 RECTANGLE SHAPE
FIG. 4 PLACEMENT BETWEEN CHANDELIERS

The fluting is part of the material of construction is typically metal but other materials will be included unique designs cast aluminum, brass, and other.

Figure 1:
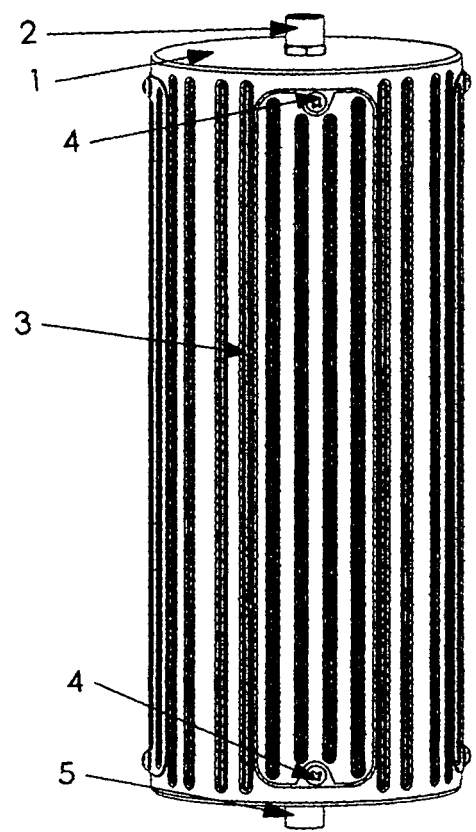
FIG. 1 depicts the cylinder shape with top & bottom with a hex nipple and, also with door to access junction box in order to make wire connections.
Figure 2:
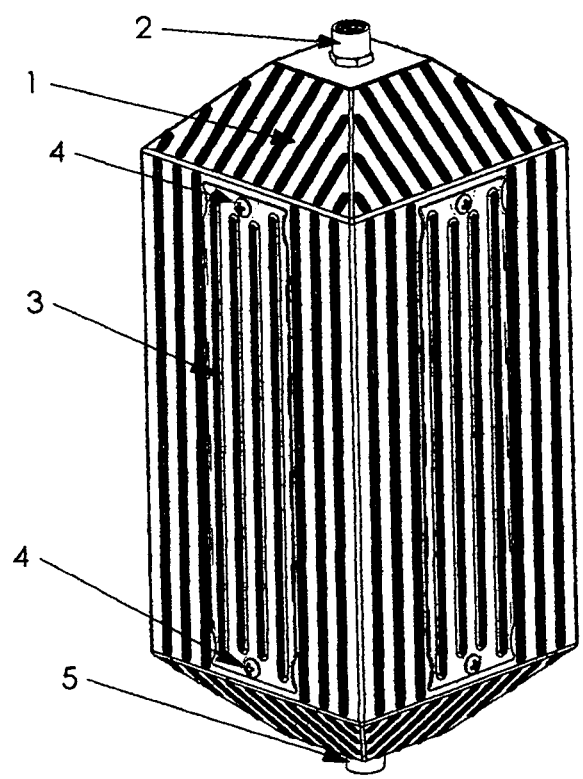

FIG. 2 depicts the unique baguette diamond shape with the same parts as FIG. 1 top & bottom hex nipples.

Figure 3:
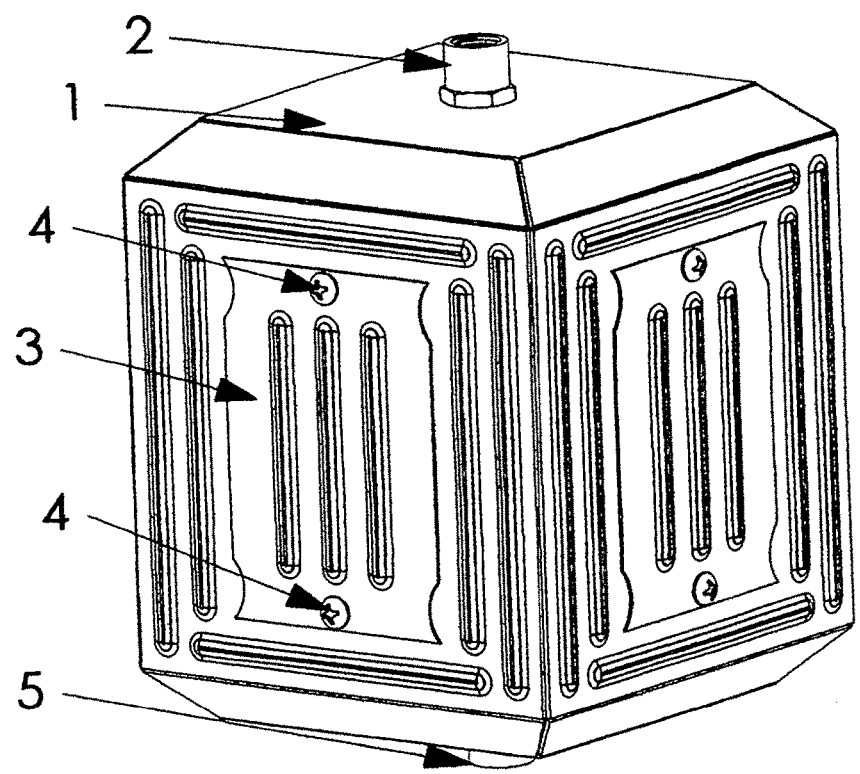

FIG. 3 Depicts the rectangle shape tapered top & bottom with offset fluted door & sides. Referring to FIG. 2 the items are identified as follows:

1. Top of J box
2. Top hex nipple
3. Door
4. Screws
5. Bottom hex nipple

Figure 4:
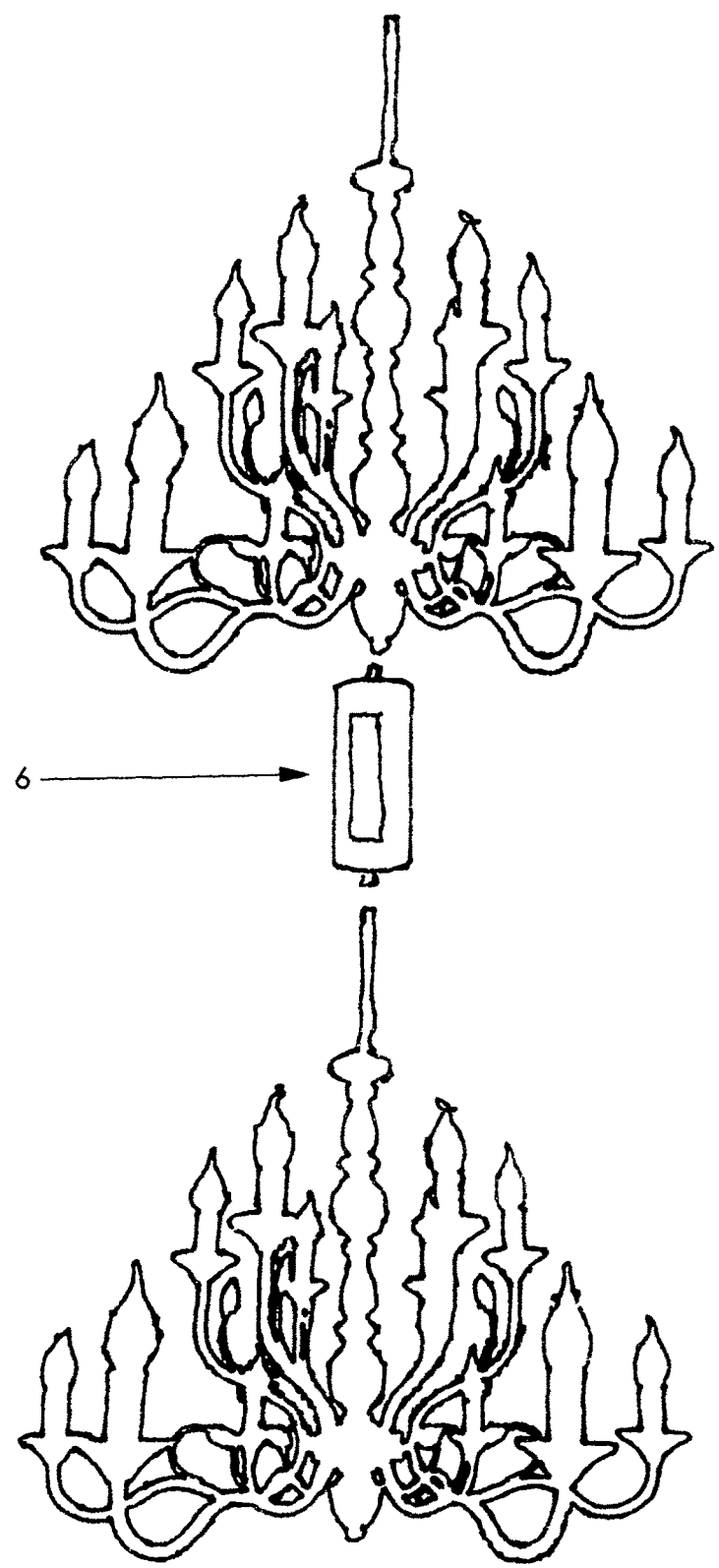

FIG. 4 Depicts how the junction box and physical connectors are used to piggyback two chandeliers.

Referring to FIG. 4, the item 6 is an adaptor kit comprising the junction box and physical connector.

The invention claimed is:

1. An assembly comprising a first chandelier, and a second chandelier, and an electrical junction box joining the first chandelier with the second chandelier comprising:
    (a) the first chandelier,
    (b) the second chandelier,
    (c) the electrical junction box in which an electrical wire may be safely connected,
    (d) a mechanical means on the top of the electrical junction box that connects to the first chandelier,
    (e) a second mechanical means on the bottom of the electrical junction box that connects to the second chandelier.

2. The assembly of claim 1, wherein wires enter from the first chandelier into the top of the junction box, wherein the first chandelier is directly connected to the top of the junction box, thereby making the wires entering from the first chandelier into the junction box not visible from outside of the assembly.

3. The assembly of claim 1, wherein the electrical junction box is constructed from aluminum or brass.

4. The assembly of claim 1, wherein the outside shape of the electrical junction box is circular, square, rectangle, multi-sided, baguette, or diamond shaped.

5. The assembly of claim 1, wherein the outside surface of the electrical junction box is fluted or flat.

6. The assembly of claim 1, wherein the junction box comprises a door.

7. A method for retrofitting a chandelier, comprising:
    (a) obtaining a first chandelier,
    (b) obtaining a second chandelier,
    (c) obtaining an electrical junction box in which electrical wire may be safely connected,
    (d) connecting the electrical junction box to the first chandelier via a first mechanical means located on the top of the electrical junction box
    (e) connecting the electrical junction box to the second chandelier via a second mechanical means located on the bottom of the electrical junction box, and
    (f) connecting electrical wires within the electrical junction box.

8. The method of claim 7, wherein the electrical junction box further comprises a door.

* * * * *